Feb. 26, 1963   A. W. DASCHKE   3,079,555
VIBRATING REED ELECTRO-RESPONSIVE DEVICE
Original Filed Jan. 24, 1955   3 Sheets-Sheet 1
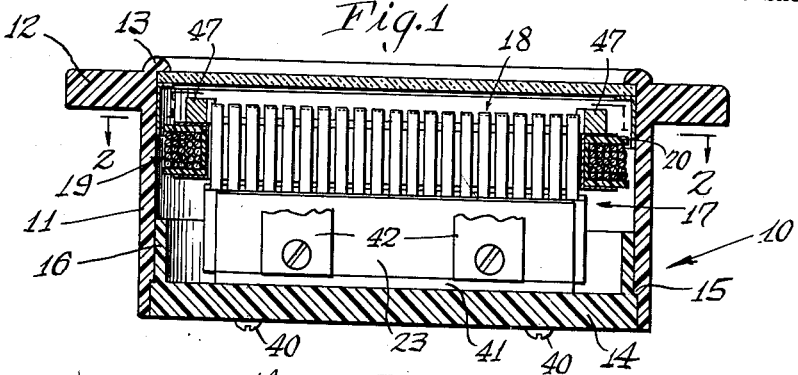
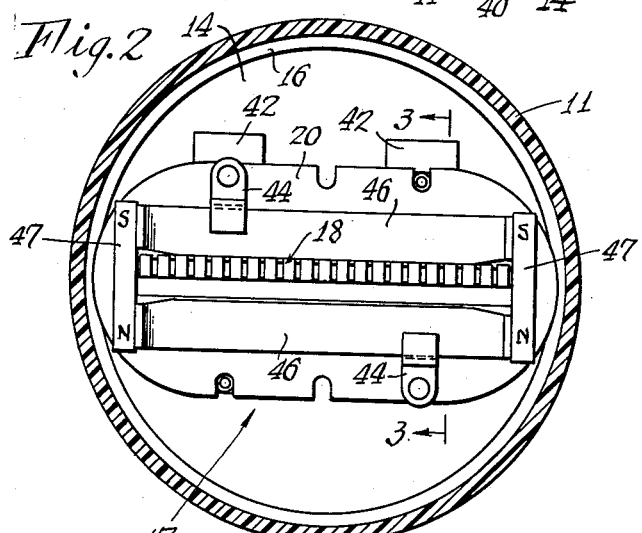
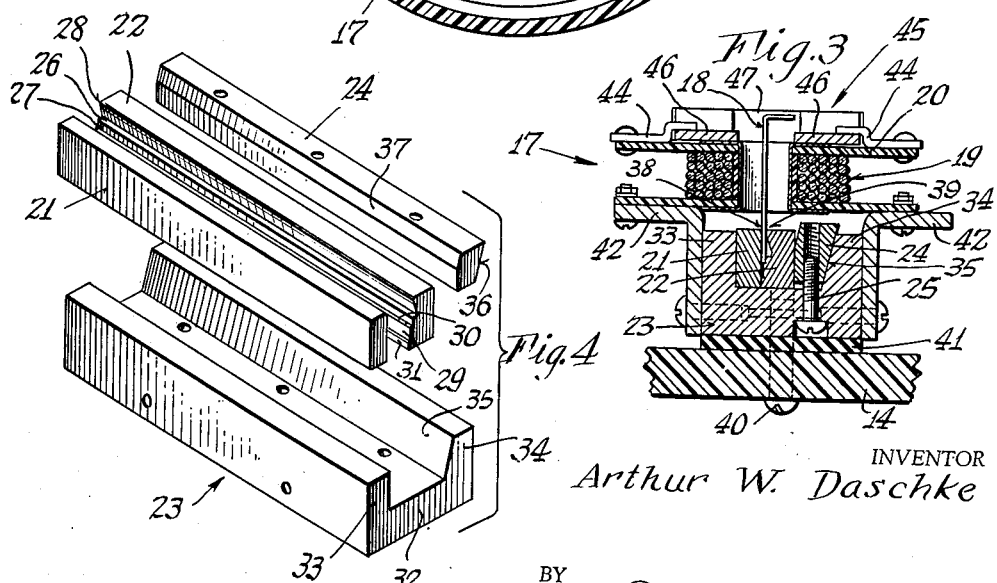
INVENTOR
Arthur W. Daschke
BY Johnson and Kline
ATTORNEYS Feb. 26, 1963 A. W. DASCHKE 3,079,555
VIBRATING REED ELECTRO-RESPONSIVE DEVICE
Original Filed Jan. 24, 1955 3 Sheets-Sheet 2
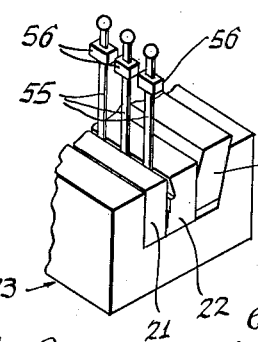
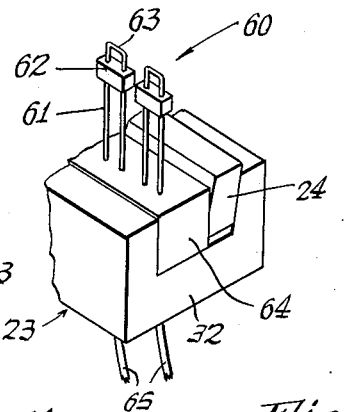
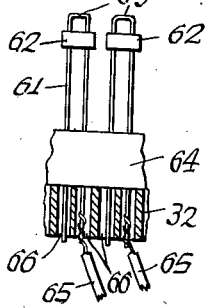
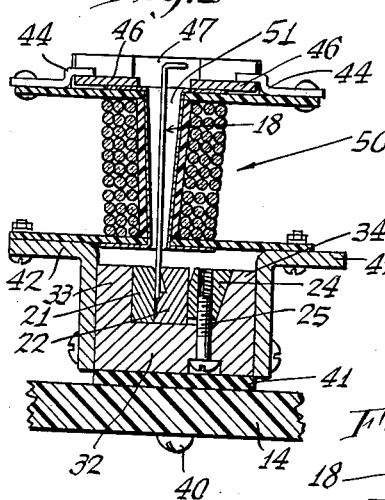
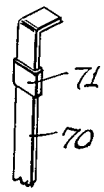
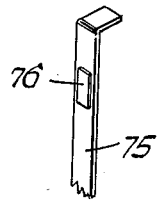
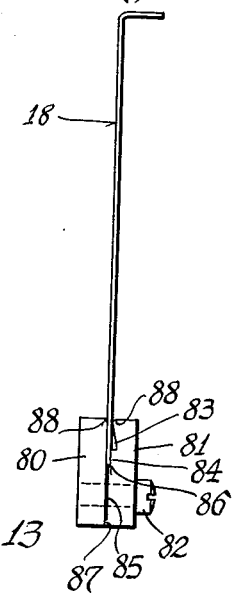
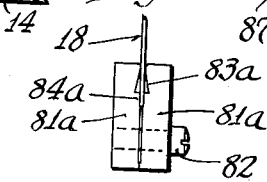
INVENTOR
Arthur W. Daschke
BY Johnson and Kline
ATTORNEYS

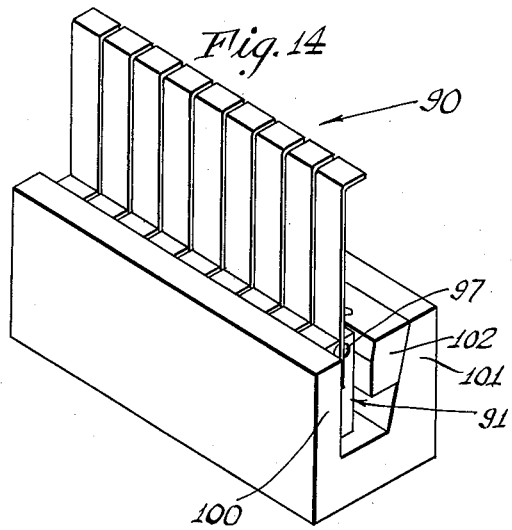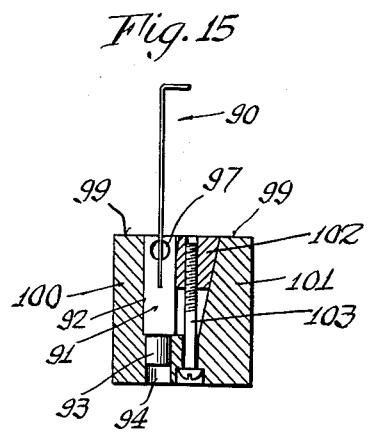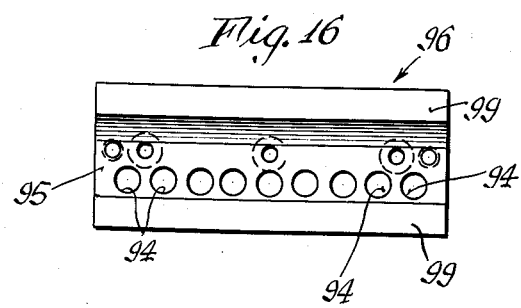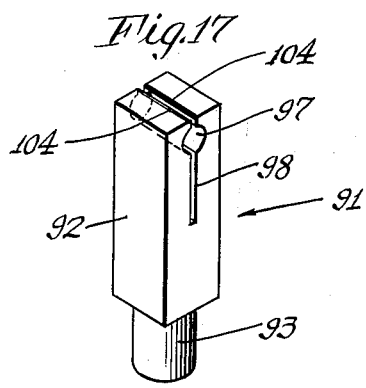

United States Patent Office 3,079,555
Patented Feb. 26, 1963

3,079,555
VIBRATING REED ELECTRO-RESPONSIVE DEVICE
Arthur W. Daschke, Morristown, N.J., assignor to J-B-T Instruments, Inc., New Haven, Conn., a corporation of Connecticut
Continuation of application Ser. No. 483,787, Jan. 24, 1955. This application Jan. 21, 1958, Ser. No. 710,382
6 Claims. (Cl. 324—80)

This invention relates to electrical equipment of the type employing vibrating members or reeds, and more particularly to vibrating-reed frequency meters.

The invention is illustrated and described in connection with different forms of a specific kind of vibrating reed meter; however, it should be understood that the invention is not limited to the specific embodiments illustrated and described herein, but is to be broadly construed in the light of the appended claims.

The present application is a continuation of my copending application S.N. 483,787 filed January 24, 1955 and entitled "Vibrating Reed Electro-Responsive Device," which is now abandoned.

An object of the present invention is to provide a novel and improved electro-responsive device embodying vibrating reeds, which device is extremely sensitive and accurate in its response.

Another object of the invention is to provide an improved reed-type device as above set forth, which has high efficiency and may be actuated with relatively small current and with but little power consumption.

A still further object of the invention is to provide an improved vibrating-reed type apparatus, in which relatively little heat is generated during use.

Yet another object of the invention is to provide an improved apparatus in accordance with the above, which is accurate and reliable in its response even though subjected to wide variations of ambient temperature.

A feature of the invention resides in the provision of an improved electro-responsive device as above characterized, which is relatively small and compact, simple in its construction, has relatively few parts, and is economical to fabricate in quantity.

In accomplishing the above objects I provide a novel electro-responsive structure comprising a vibratable reed and a unique mounting therefor comprising means clamping one end portion of the reed together with means clamping the reed at a zone spaced from said end portion, the intervening portions of the reed being free of clamping forces. The clamping means may comprise a pair of rigid bars disposed side-by-side and located on opposite sides of the reed, and means forcing said bars toward each other to securely hold the reed in operative positions, or it may comprise a single member having a slit receiving the reed and a groove or recess in at least one wall of the slit, adjacent an outer wall of the member. Where the bars are used they preferably engage the reeds and physically clamp against them, and by such organization I provide a sturdy and unvarying mount, which is not affected by temperature or subsequent operation or vibration of the reeds. I further provide, closely juxtaposed to the said mount, a novel driving coil structure characterized by a tapered air core, by which leakage flux is greatly minimized and maximum utilization of the energizing current is obtained.

In several embodiments of the invention the vibrating reeds are constituted of non-magnetic material having optimum mechanical properties, especially elasticity and constancy in length with changes in temperature. Carried by said reeds are magnetic members or riders having optimum magnetic properties, and with such organization there is realized the benefit of desirable mechanical and magnetic properties in one component, enhancing the efficiency and sensitivity of the device.

The mechanical portion of the reed may, with the above arrangement, have different cross sections, as for example round cross section, further improving the performance of the device, and tuning of the reed may be accomplished in a simple and quick manner by shifting the rider or magnetic armature along the reed body.

In other forms of the invention the rider is shown as being plated, inlaid, or painted on the reed body, making for economy in manufacture, and since the rider enables the magnetic material to be concentrated within the core of the coil, the effect of external stray fields is appreciably lessened.

Instead of providing the usual scale plate within the instrument housing, I provide a scale on the transparent window of the housing, and such scale may be in the form of a decalcomania or may be printed or otherwise reproduced, eliminating the necessity for a separate scale plate and further effecting a reduction of manufacturing cost.

Other features and advantages will hereinafter appear.

In the accompanying drawings:

FIGURE 1 is an axial sectional view of a frequency meter made in accordance with the invention.

FIG. 2 is a transverse sectional view taken on line 2—2 of FIG. 1.

FIG. 3 is a fragmentary sectional view taken on line 3—3 of FIG. 2.

FIG. 4 is an exploded perspective view of the reed-mounting means employed in the instrument of FIGS. 1–3.

FIG. 5 is a fragmentary axial sectional view of a frequency meter, illustrating another embodiment of the invention, said meter having incorporated in it a tapered-core driving coil.

FIG. 6 is a fragmentary detail illustrating a modification of the invention and showing in perspective a portion of a vibrating reed assemblage made in accordance with the invention.

FIG. 7 is a view like FIG. 6 but illustrating a further modification of the invention.

FIG. 8 is a fragmentary elevational view of the reed assemblage of FIG. 6, showing a method of effecting electrical connections to the reeds.

FIG. 9 is a fragmentary perspective view of a reed and mounting means therefor somewhat on the order of that shown in FIG. 7, but reduced to its simplest form.

FIG. 10 is a fragmentary perspective view of a reed illustrating another embodiment of the invention.

FIG. 11 is a fragmentary perspective view of a reed illustrating still another embodiment of the invention.

FIG. 12 is a fragmentary elevational view illustrating another different embodiment of the invention having a simplified reed mount.

FIG. 13 is a fragmentary elevational view illustrating yet another embodiment of the invention, wherein the clamping bars for the reed are similar in configuration.

FIG. 14 is a perspective view of a set of reeds and mounting means therefor, illustrating another form of the invention.

FIG. 15 is a vertical sectional view taken through the mounting means of FIG. 14.

FIG. 16 is a top or plan view of one of the mounting members of FIG. 14.

FIG. 17 is a perspective view of an individual clamping member for a single reed.

The frequency meter shown in FIGS. 1–4 comprises a casing 10 having a cylindrical body 11 provided with a mounting flange 12 on its front portion, and a window-retaining lip 13. The body 10 further comprises a separate transverse rear wall 14 adapted to fit into the rear cylindrical portion of the body 11 against a shoulder 15 thereof, the wall 14 having an annular flange 16 extending for a short distance forwardly into the body 11.

Within the casing 10 a novel and improved instrument movement 17 is provided. Referring to FIGS. 2 and 3, the instrument movement 17 comprises a set of vibratable reeds 18 of magnetic material, extending through a driving coil 19 wound on a bobbin or spool 20. By the present invention an improved mount is provided for the reeds 18, comprising a pair of rigid bars 21 and 22 disposed side-by-side and engaging opposite sides of corresponding ends of the bars, see FIGS. 3 and 4.

The bars 21 and 22 are held together and in clamping engagement with the reeds 18 by a heavy-section channel member 23 and a rigid, wedging bar 24, the latter being pulled to and held in wedging position by screws 25. The bars 21, 22 and 24 and the channel member 23 are made of a non-magnetic material having high tensile strength such as strong aluminum alloy. The bar 21 may have a rectangular cross-sectional shape as shown.

Preferably the bar 22 is provided with a longitudinally-extending shallow groove 26 in the side adjacent to the bar 21, and provided with a recessed portion 27 extending along the edge of the groove 26 to effect a two-point engagement with the reeds 18. One point of engagement is constituted by an edge 28 of the bar 22, and the other point of engagement is effected by the recessed portion 27. A second recessed portion 29 is also provided on the bar 22, extending along the first recessed portion 27 and providing a shoulder 30 therewith for the purpose of positioning the reeds 18 with their supported ends substantially in alignment. A land 31 on the bar 22 engages the bar 21 and constitutes a fulcrum point when the bars are clamped together by the wedging bar 24.

The channel member 23 has a bottom or web portion 32 and side flanges 33 and 34, the latter flange having a sloping inner face 35 engageable with the wedging bar 24 to shift the latter diagonally inward against the bar 22 when the screws 25 are tightened.

As shown in FIG. 4 the wedging bar 24 has a sloping side surface 36 engageable with the sloping face 35, and has an inner sloping surface 37 providing clearance whereby the clamping pressure of the wedging bar 24 is applied intermediate the upper and lower edges of the bar 22.

By the provision of the above improved mount or clamping means for the reeds 18 there is obviated the use of solder which was heretofore employed in securing the reeds to a mounting bar. The prior practice of using solder was slow and costly, and the results were not uniform because of variations encountered in the flowing of the solder, capillary action thereof, etc., attendant the soldering operation.

I have found that with the prior, soldered-type of mounting means the soldered connections would change slightly in use, adversely affecting the readings of the instrument as effected by the initial calibration or setting. The change in the soldered connections in effect caused an increase in the active length of the reeds. By the provision of the improved mounting means described above the time-consuming and costly soldering operation is eliminated and a much more reliable operation is had throughout the life of the instrument.

It is preferred that the reed-contacting edges or corners 38 and 39 of the bars 21 and 22, see FIG. 3, be formed with a small radius to eliminate the possibility of variations in said edges, which might occur if they were left sharp.

Referring to FIG. 3 the mounting means for the reeds 18 is attached to the rear transverse wall 14 of the casing 10 by screws 40, and preferably a resilient pad 41 is interposed between the channel member 23 and the wall 14 to provide a resilient mounting.

By the present invention the driving coil 19 is made to have a relatively short axial length as compared with its width and transverse length or peripheral dimensions. This is best seen in FIGS. 1 and 3, wherein the bobbin 20 is shown as having a relatively small spacing between its coil-confining flanges. The driving coil 19 and bobbin 20 are mounted by means of angle brackets 42 on the channel member 23, and the bobbin has clamping brackets 44 by which a permanent magnet field structure 45 having pole pieces 46 and bar magnets 47 is attached to the coil to influence the reeds 18.

The field structure comprising the pole pieces 46, magnet 47 and its relationship to the bobbin 20 and coil 19 are disclosed and claimed in the copending application of Arthur W. Daschke and Nathaniel L. Hooper, Serial No. 480,421 filed January 7, 1955, now abandoned, and constitutes no part of the present invention.

A modification of the invention is shown in FIG. 5. In this figure parts which are similar to those described above have been given like characters. In the modification of FIG. 5 a novel driving coil 50 is provided, having a tapered air core 51 through which the reeds 18 extend.

The shape of the air core 51 is similar generally to the zone of movement of the reeds, thereby holding to a minimum the leakage flux of the coil 50. That is, the core 51 is somewhat wedge-shaped, with the axis of the coil 50 extending through the central portions of the large and small areas of the core, the small core area being disposed adjacent the supported ends of the reeds. With this tapered-coil construction more efficient utilization is made of the flux produced by the coil 50, thereby enabling the instrument to have a sensitive response even though weak energizing currents pass through the driving coil.

In accordance with the invention I provide novel reed members, as shown in FIG. 6, constituted of elongate bodies 55 formed of material having optimum mechanical properties, as for example elasticity and constancy in length with changes in temperature. On the bodies 55 I provide magnetic armatures or riders 56, constituted of material having optimum magnetic properties, including high permeability and magnetic constancy with changes of temperature. With this construction a much more reliable and sensitive instrument movement is provided, since the properties which enable the reeds to vibrate are a maximum and are constant with changes in temperature, as well as the magnetic properties which enable the reeds to respond to the flux of the driving coil. I have found that a material which is highly advantageous for use in the reed bodies is that known by the trademark Elgiloy, or Cobenium, comprising cobalt 40%, chromium 20%, nickel 15%, molybdenum 7%, manganese 2%, beryllium .04%, carbon .15%, and the balance iron, and materials which are advantageous for use in the riders 56 are those known by the trade-marks Moly-permally 4–79 and Hy-Mu–80. Not only is advantage had of the mechanical and magnetic properties of the reed bodies and riders, but also initial tuning of the reeds may be easily and quickly effected by slightly shifting the riders 56 along the reed bodies to the correct positions for resonance, and thereafter the riders may be fixed to the bodies by any suitable means.

In FIGS. 7 and 8 non-magnetic reeds 60 are shown, formed of U-shaped pieces of round wire 61 having magnetic riders 62 disposed adjacent the upper or yoke portions 63 of the wires. The wire 61 may be advantageously embedded in a solid block 64 of plastic or other suitable material, and as shown in FIG. 8 the lower extremities of the wire 61 may project from the block 64 and be attached to electrical leads 65 where the reeds are to constitute part of a relay or indicator system. For this purpose, the channel member 23 is provided with openings 66 in the base portion 32 thereof, to effect clearance.

As shown in FIG. 9 the reeds 60 and mounting block 64 may constitute an assemblage independent of the channel member 23 and wedge 24, said channel and wedge not being required. In this event, any suitable fastening means may be employed in conjunction with the block 64 to attach it to the instrument frame or casing.

In accordance with the invention the vibrating members or reeds may be formed as shown in FIGS. 10 or 11. In FIG. 10 a flat reed body 70 of non-magnetic material chosen for its mechanical properties carries a magnetic rider 71 of material chosen for its magnetic properties. The rider 71 may be formed on the body 70 by a plating process, or by a metal spraying process or a painting process. In FIG. 11 a reed body 75 is provided with a magnetic rider 76 which is formed as an inlay in the body 75. In each instance the material of the reed body is chosen for high elasticity and constancy in length with changes in temperature, and the rider is chosen for high permeability and magnetic constancy with changes in temperature.

A modified form of reed mount is shown in FIG. 12. In this figure the reeds 18 are clamped between a pair of bars 80 and 81 secured together by screws 82. The bar 81 has a shallow longitudinally-extending groove 83 and a recessed portion 84 extending along one side of the groove 83, the portion 84 engaging the lower end portions of the reeds 18. The bar 81 has a second recessed portion 85 providing with the portion 84 a shoulder 86 to position the reeds 18. Also, the bar 81 has a land portion 87 constituting a fulcrum for engagement with the lower edge portion of the bar 80. The upper edges 88 of the bars are chamfered or provided with small radii where they engage the opposite sides of the reeds 18.

A modified mounting means somewhat along the lines of that of FIG. 12 is shown in FIG. 13. In this figure, a pair of clamping bars 81a is provided, secured together by draft screws 82, said bars clamping between them reeds 18. The bars 81a are similar in configuration, having longitudinally extending grooves 83a and recessed portions 84a extending along the grooves, said recessed portions clamping the lower extremities of the reeds and the uppermost corner portions of the bars clamping the reeds at points spaced above the lower, clamped portions thereof.

It will be noted that with the various clamping means provided by the invention an area located at the lower extremity of each reed is securely clamped, and a smaller area spaced above said lower clamping area is also clamped. In other words, the clamping means engage the reed at two spaced areas, the upper area being somewhat in the nature of a line contact, extending transversely of the reed body.

Another embodiment of the invention is shown in FIGS. 14–17. In these figures a set of reeds 90 is shown, each reed being mounted in a different and individual mounting member or clamp 91. Each clamp 91 comprises a rectangular block or body 92 having a cylindrical anchorage-and-positioning portion 93 which is received in one of a plurality of recesses 94 provided in the base portion 95 of a channel member 96.

The upper portions of the clamps 91 have transverse bores 97 and longitudinally extending slits 98 intersecting the bores 97. Preferably, as shown in the illustrations, the bores 97 are located closely adjacent the upper extremities of the clamps 91 and said upper extremities are flush with or in the same plane as the upper edge surfaces 99 of the side flanges 100 and 101 of the channel member 96. A clamping bar 102 is provided, secured in place by screws 103, said clamping bar constituting a wedge and applying clamping pressures to the individual clamps 91 to cause the latter to securely grip and hold their associated reeds. The opposite transverse edges 104 of the clamps 91 are preferably chamfered to provide a small radius on them.

With the organization of FIGS. 14–17 flexibility is had in the manufacturing procedure as regards the number of reeds which are to be used. Either one, two, three or more reeds may be readily incorporated in a particular instrument, each reed being securely individually clamped and held, and prevented from becoming loose during the life of the instrument.

By the above described construction I have effected notable improvements in the performance of vibrating reed instruments. Sensitivity, accuracy and reliability have been greatly enhanced, and due to increased efficiency only small energizing currents are required to provide satisfactory indications. Heat produced is held to a minimum, and the accuracy of the instrument is not affected over a wide range of ambient temperatures. The structure is stable and reliable throughout an extended period of use, while at the same time being relatively simple and economical to fabricate. By concentrating the magnetic portion of the reed within the driving coil, in conjunction with the tapered coil construction, the effect of stray external fields is greatly minimized, so that the operation of the instrument is not adversely affected thereby.

Variations and modifications may be made within the scope of the claims and portions of the improvements may be used without others.

I claim:

1. In a frequency-responsive device, a reed mount; a vibratable reed carried by said mount, comprising a pair of wires, extending side-by-side, one set of corresponding ends of the wire being secured to the mount and the said wires being of uniform and equal cross section throughout their lengths; and means securing the other ends of the wires to each other for simultaneous and identical vibrating movements, said wires carrying separate magnetic means slidable along their lengths and enabling them to respond to a magnetic flux.

2. The invention as defined in claim 1 in which the mount comprises a bloc of plastic material in which the wires are embedded.

3. The invention as defined in claim 1 in which the means securing the wires to each other comprises a section of wire extending between the ends of the wires, said wire section and wires being integral with each other and constituted of a single piece of round wire.

4. The invention as defined in claim 1 in which the magnetic means comprises a narrow member extending between and transversely of the wires and secured thereto.

5. A flux-responsive vibratable reed for an electrical frequency-sensitive device, comprising an elongate wholly homogeneous reed body formed wholly of a single alloy material having as an outstanding characteristic a stable elasticity with changes in its temperature over a large range of values; and a wholly homogeneous magnetic rider formed wholly of a single alloy material and slidably attached to said body, the material of said rider having as an outstanding characteristic a stable magnetic permeability with changes in its temperature over a large range of values.

6. In a frequency-responsive device, the combination of a vibratable reed of non-magnetic material; and a magnetic rider carried by and frictionally gripping said reed, said rider being shiftable along the reed while frictionally gripping the same, to tune the reed to the desired resonance, and said frictional gripping of the reed being sufficient to maintain the adjusted position of the rider for tuning purposes.

References Cited in the file of this patent

UNITED STATES PATENTS

| 375,654 | Segrove | Dec. 27, 1887 |
| 959,934 | Hartmann-Kempf | May 31, 1910 |
| 1,253,402 | Lovejoy | Jan. 15, 1918 |
| 1,430,379 | Hubbell | Sept. 26, 1922 |
| 1,637,442 | Dorsey | Aug. 2, 1927 |

(Other references on following page)

UNITED STATES PATENTS

| | | |
|---|---|---|
| 1,763,853 | Karolus | June 17, 1930 |
| 1,882,399 | Pierce | Oct. 11, 1932 |
| 2,139,220 | Blackman | Dec. 6, 1938 |
| 2,160,876 | Lakatos | June 6, 1939 |
| 2,251,356 | Harris | Aug. 5, 1941 |
| 2,295,902 | Kass | Sept. 25, 1942 |
| 2,447,191 | Lingel | Aug. 17, 1948 |
| 2,514,315 | Dickerson | July 4, 1950 |
| 2,521,401 | Ohman et al. | Sept. 5, 1950 |
| 2,601,801 | Langloys | July 1, 1952 |
| 2,668,944 | Schwyn et al. | Feb. 9, 1954 |
| 2,689,280 | Brown | Sept. 14, 1954 |
| 2,707,234 | Dostal | Apr. 26, 1955 |
| 2,714,859 | Klemme | Aug. 9, 1955 |
| 2,733,631 | Morgillo | Jan. 31, 1956 |
| 2,736,824 | Roberts | Feb. 28, 1956 |
| 2,765,693 | Link | Oct. 8, 1956 |

FOREIGN PATENTS

| | | |
|---|---|---|
| 23,317 | Great Britain | Feb. 20, 1908 |
| 374,168 | Great Britain | June 9, 1932 |
| 681,703 | Germany | Sept. 29, 1939 |
| 725,354 | Germany | Sept. 19, 1942 |
| 223,570 | Switzerland | Dec. 1, 1942 |
| 880,574 | France | Jan. 4, 1943 |
| 271,669 | Switzerland | Feb. 1, 1951 |
| 1,168,607 | France | Dec. 11, 1958 |

OTHER REFERENCES

A New Idea in Vibrating Reed Frequency Meters, publication VF-43 copyright 1943; by J-B-T Instruments, Inc., 441 Chapel Street, New Haven, Conn.

"Tuning Fork Standards for Meter Calibration," article in Electrical World, January 8, 1944; page 92 (116).